(12) United States Patent
Binenstock (10) Patent No.: US 9,253,288 B2
(45) Date of Patent: Feb. 2, 2016

(54) LOCATION-AWARE MOBILE CONNECTIVITY AND INFORMATION EXCHANGE SYSTEM

(76) Inventor: Ishai Binenstock, Modiin (IL)

( * ) Notice: Subject to any disclaimer, the term of this patent is extended or adjusted under 35 U.S.C. 154(b) by 210 days.

(21) Appl. No.: 13/806,783

(22) PCT Filed: Jun. 28, 2011

(86) PCT No.: PCT/IB2011/052835
§ 371 (c)(1),
(2), (4) Date: Dec. 24, 2012

(87) PCT Pub. No.: WO2012/001624
PCT Pub. Date: Jan. 5, 2012

(65) Prior Publication Data
US 2013/0103946 A1    Apr. 25, 2013

Related U.S. Application Data

(60) Provisional application No. 61/360,564, filed on Jul. 1, 2010, provisional application No. 61/439,976, filed on Feb. 7, 2011.

(51) Int. Cl.
H04L 29/06 (2006.01)
H04W 12/08 (2009.01)
H04L 9/08 (2006.01)
H04W 84/18 (2009.01)

(52) U.S. Cl.
CPC ......... *H04L 67/42* (2013.01); *H04L 9/08* (2013.01); *H04L 63/0492* (2013.01); *H04L 63/102* (2013.01); *H04L 63/107* (2013.01); *H04W 12/08* (2013.01); *H04W 84/18* (2013.01)

(58) Field of Classification Search
None
See application file for complete search history.

(56) References Cited

U.S. PATENT DOCUMENTS

| | | |
|---|---|---|
| 2006/0167784 A1 | 7/2006 | Hoffberg |
| 2009/0259720 A1 | 10/2009 | Heins et al. |
| 2010/0070758 A1 | 3/2010 | Low et al. |
| 2010/0105409 A1 | 4/2010 | Agarwal et al. |

*Primary Examiner* — Samson Lemma
*Assistant Examiner* — Simon Kanaan
(74) *Attorney, Agent, or Firm* — Mark M. Friedman (57) ABSTRACT

A computer platform and method for managing secure data transactions between user accounts on a server, based on the respective locations of mobile user devices related to the user accounts, where the user devices create a secured mobile communication cloud between themselves to ensure secure data communications.

26 Claims, 6 Drawing Sheets

LOCATION-AWARE MOBILE CONNECTIVITY AND INFORMATION EXCHANGE SYSTEM

FIELD AND BACKGROUND OF THE INVENTION

The present invention relates to a mobile information exchange system and, more particularly, to a location-aware system for mobile connectivity and information exchange.

The ubiquitous use of mobile technology, specifically handheld cellular devices, has given rise to a number of location based applications available to cellphone users. Foremost among such applications are GPS based tracking applications which allow users to pinpoint the current location of the mobile/GPS-enabled device for the purposes of navigation or gaining information about the local surroundings. GPS-like systems have given powerful handheld devices location based abilities. Furthermore, wireless data exchange systems such as BlueTooth™, RFID and NFC (Near Field Communication), allow mobile devices to be aware of compatible devices within the immediate vicinity.

One of the potential goals of modern technology is the collaboration between mobile devices/smart-phones and social networks (e.g. FaceBook™, Twitter™, MySpace™, LinkenIn™ etc.) in order to create a market for providing users with a secure way to expose and share their social network accounts/personal details with other users who are in the same geographical area (e.g. office, club, classroom, coffee shop or simply on the street) using smart-phones/devices.

Various attempts have been made to facilitate data exchanges between co-located individuals via communication devices. U.S. Pat. App. Ser. No. US 2010/0070758 to Low et al. (hereinafter "Low") discloses a system for analyzing tokens which have been exchanged by co-located devices, and creating Groups as a result of the analysis. The system disclosed by Low facilitates the automatic grouping of individuals that attended an event in the same location at the same time. The system, however, does not facilitate the exchange of data between user accounts stored on the server, only between the devices themselves (e.g. SMS messages, calendar sharing, telephonic communication etc.), which significantly limits the size of the data that is transferable. A further drawback stems from the fact that the devices generate the tokens locally using a cipher. It would be of better design and much more efficient to perform the task of token generation on a central server that has greater control and perspective over what is occurring in the system at any given moment. For example:

1. In case someone manages to hack the token encryption mechanism of a certain client it is the client's responsibility to detect the hack and switch encryption key. On the other hand, if the token had been generated by the server then it would be a much easier task for the server to identify the hack—e.g. if the server receives tokens from the same user but from two different parts of the city, then it very likely that the encryption key has been hacked.

2. A computer worm loaded onto a target device can generate valid tokens of the worm's creator (a malicious user also in the system) and can now generate valid tokens of the malicious user in place of the tokens of the target device. This would make the targeted user visible to others as the malicious user or potentially a third user from whom the malicious user has stolen a cipher.

It would be highly advantageous to have a location-aware system that securely facilitates exchange of remote information regarding local entities. It would furthermore be advantageous to have a Unique Identifier (UID) which is generated by a remote server and downloaded to the device, whereby the UID can be periodically changed or otherwise protected from malicious attacks.

Definitions

The mobile device can be a cellular or satellite phone enabled with either GPS capabilities or similar satellite-based positioning capabilities that can pin-point the X and.Y coordinates or X, Y and Z coordinates of the device. Global Navigation Satellite System (GNSS) receivers, using the GPS, GLONASS, Galileo or Beidou system, are used in many applications. For simplicity sake, the term GPS will be used in this document but it is to be understood that this is only an exemplary reference. The GPS device may either be integrated into the mobile handset or an external device coupled (wired or wireless) to the handset.

'Mobile device', 'smart phone', 'cell-phone', 'cellular device' and similar terms are used interchangeably here, generally referring to a mobile handset with at least celluar telephonic communications capabilities, computing capabilities, and wireless local/short-range data communication capabilities (e.g. Bluetooth™, RFID, NFC etc.). GPS-like capabilities are preferred in some embodiments. The current invention pertains equally to mobile computing platforms having the same capabilities, even those not generally used for telephonic communications or even lacking such features.

The two types of wireless technologies readily available on most mobile devices can generally be divided into Local Area Wireless Communication 116 (LAWC) technology and Wide Area Wireless Communication 118 (WAWC) technology (elements of the aforementioned names are borrowed from the computer technology terminology Local Area Networks and Wide Area Networks, although no inferences should be made between the two technologies). The term 'communication' with reference to LAWC and WAWC can be two-way communication or only one-way communication. The communication medium may be sound waves, electromagnetic energy such as radio waves, light waves and the like. An example of the LAWC technology is Bluetooth™ (BT), but it is understood that the use of Bluetooth technology herein is merely exemplary and that other communication technologies such as, but not limited to, RFID, NFC , IrDA, UWB and others may be employed in place of Bluetooth. Examples of WAWC include cellular communication, WIFI and satellite communication. In some instances the distinction between LAWC and WAWC may not be so clear, but in general the given definitions will suffice to distinguish between technology types employed within the scope of the invention.

The LAWC enabled device passes information "on contact" with other people or entities automatically, semi-automatically and/or manually. The terms "contact", "vicinity" and "proximity", as used herein, refer to physically close proximity between two parties, which can be defined as a range of distance between the two entities (potentially calculated using GPS triangulation, cellular coordinate recognition, etc.) or the ability to initiate direct Bluetooth discovery or other technology that detects a direct location link between two people (e.g. using RFID reader or NFC communication). Proximity is defined as the upper range of data communication capabilities for short-range communication technology. The number of exemplary short-range technologies and their transmission/communication ranges follow. Bluetooth technology transmits up to approximately 30 meters or 100 feet. RFID technology has a number of different ranges, depending on various factors. Typically, the read range is approximately between 3 and 300 feet (1-100 meters). RFID readers can read tags in smart cards from about 3 feet; tags on pallets and cases of goods can be read from approximately 20-30 feet and battery-powered tags (e.g. tags used in toll collection) up to approximately 300 feet. NFC technology can typically transmit data over a distance/range of between 4 cm and 1.2 m.

A 'Secured Mobile Communication Cloud' is an ad-hoc cloud-like network between mobile/static communication devices, where the data transactions are secured at least by one or more of the security measures detailed elsewhere herein.

The server and encompassed units and features of the present invention can be embodied in hardware, software, firmware or any combination thereof. The mobile application and features of the present invention can be embodied in hardware, software, firmware or any combination thereof.

SUMMARY OF THE INVENTION

The current invention is a system and method for providing users with a way to expose their personal information/social network account/other information using the LAWC capabilities of their personal/mobile communication device. The idea is to use a combination of Bluetooth™-like (i.e. short-range wireless technology) support and Internet access in order to gain information on entities in the immediate vicinity of the device.

According to the present invention there is provided a computing platform including a server including: (i) a plurality of user accounts, wherein each user account is related to a user device; and (ii) a Data Distribution Engine (DDE) for effecting data exchanges between at least two of the user accounts such that at least two user devices, related to the at least two user accounts, are in physical proximity to each other and have established a Mobile Communication Cloud (MCC) therebetween.

According to further features in preferred embodiments of the invention described below the MCC is established between at least two proximal user devices, wherein each user device includes a Local Area Wireless Communication (LAWC) component capable of establishing the MCC.

According to still further features, the server communicates with each related user device via Wide Area Wireless Communication (WAWC) technology and wherein each user account is identified by a Unique Identification (UID) stored on a related user device.

According to still further features, the MCC is an Unsecure MCC (U-MCC) or a Secure MCC (S-MCC).

According to still further features, the UID is an Unprotected UID (U-UID) or a Protected UID (P-UID).

According to still further features, each user device is operable to receive a U-UID from at least one proximal LAWC enabled device via the U-MCC and communicate the received U-UID to the server; and wherein the U-UID grants access to a predefined data set related to a user account identified by the U-UID.

According to still further features, the user device is operable to receive a P-UID from at least one proximal LAWC enabled device via the SMCC and communicate the received P-UID to the server; and wherein the P-UID grants access to data related to a user account identified by the P-UID.

According to still further features, the S-MCC includes at least one security protocol selected from the group consisting: (i) a time interval protocol, wherein the server transmits a time directive via the WAWC component to a user device, the time directive including: an activation time, a de-activation time and an instruction set, wherein the instruction set includes instructions for the user device to initiate an activation cycle by steps including: activating the LAWC component at the activation time, performing a LAWC proximity scan to detect proximal LAWC enabled devices and deactivating the LAWC component at the deactivation time; (ii) a space change protocol, whereby upon determination, by the server, that a user population detected within a predetermined spatial area has altered in membership by a predetermined value, the server initiates an activation cycle; and (iii) a managed auto-detect protocol, whereby the LAWC component is instructed to perform a single activation cycle in accordance with a single time directive.

According to still further features, the P-UID includes at least one protection mechanism including a Period Identification Update mechanism, whereby the P-UID is changed each predetermined time cycle by the server.

According to still further features, the P-UID further includes a Challenge Response Mechanism that can be activated by one user device against another user device to validate the authenticity of the identity of the holder of the P-UID. This is particularly useful for instances where malicious users retransmit other users received P-UIDs before those have been renewed thereby impersonating the other users. The Challenge Response Mechanism includes the steps of: (i) providing each P-UID with a Public Key and a related Private key which are stored on the server, wherein the related Private key is operable to decrypt data encrypted by the Public key and wherein the Public key and the Private key are periodically updated by the server, and wherein said. Private Key can only be downloaded from said server by a said related user device identified by a username and a password; (ii) First device creates direct connection with second device and ask for second device P-UID; (iii) the second user device sends a P-UID. (iv) First user device gets second user device P-UID and downloads the first Public key from server , encrypting a passcode with the second user P-UID public key and sending (because it is direct connection) the encrypted passcode and First P-UID Public key to the second user device; (iv) The second user device receiving the encrypted passcode and first P-UID public key, decrypting the passcode using the second P-UID Private key (access only by true user by user name and password) related to the second P-UID Public Key exposed by server to the first device, re-encrypting the passcode with the first P-UID Public key and sending the re-encrypted passcode back; and (v) the first user device receiving the re-encrypted passcode, re-decrypting the re-encrypted passcode with a first P-UID Private key, related to the first Public key and comparing the re-decrypted passcode with the passcode encrypted initially with the second P-UID Public key; wherein if the re-decrypted passcode matches the passcode encrypted with the second P-UID Public key then the identity of the device's holder which is logged in to the system using his user name and password matches the identity that the device is broadcasting and the P-UID is secure. According to still further features, the computing platform further includes a Relational Network feature, wherein if a first user device is in proximity to a second user device and the second user device is in proximity to a third user device then the DDE is operable to effect data exchanges between a first user account related to the first user device and a third user account related to the third user device via a second user account related to the second user device.

According to still further features, each registered user account further includes a Data Box, the Data Box operable to contain user specified data sets, and wherein the DDE is operable to transfer at least part of the specified data sets to additional registered user accounts, where at least part of the specified data sets is operable to be elected in accordance with at least one predefined filter.

According to still further features, the related user device is a mobile communication device or a static transceiver device.

According to still further features, the server further includes: (iii) a Commenting Unit (CU), the CU operable to: (A) receive a comment data set from a mobile communication device, the comment data set relevant to a static transceiver device, wherein the static transceiver device is proximal to the mobile communication device; and (B) publish the comment data set to additional mobile communication devices when the additional mobile communication devices are proximal to the static transceiver device.

According to still further features, the comment data set includes one or more elements selected from the group including: audio data, visual data, and text data.

According to still further features, the server further includes: (iv) a Real Time Uploading Unit (RTUU), for receiving a least one commenting data set from a mobile telecommunication device; and publishing the at least one commenting data set to additional user accounts, where the at least one commenting data set further includes one or more elements selected from the group including: audio stream, video stream.

According to still further features, the server further includes: (iii) a third Party Interface (3PI) unit, whereby the 3PI unit facilitates interaction between at least one user device, at least one user account related to the at least one user device and a third party entity.

According to still further features the 3PI unit facilitates interaction between at least two said user devices, related to the at least two user accounts, that have established an MCC therebetween and a third party entity.

According to still further features, the third party entity is an entity selected from the group including: a website, a web service, an application, a social network, and an inter-network based system.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of a location-aware data sharing communication platform according to the present invention may be better understood with reference to the drawings and the accompanying description.

Figure 1A:
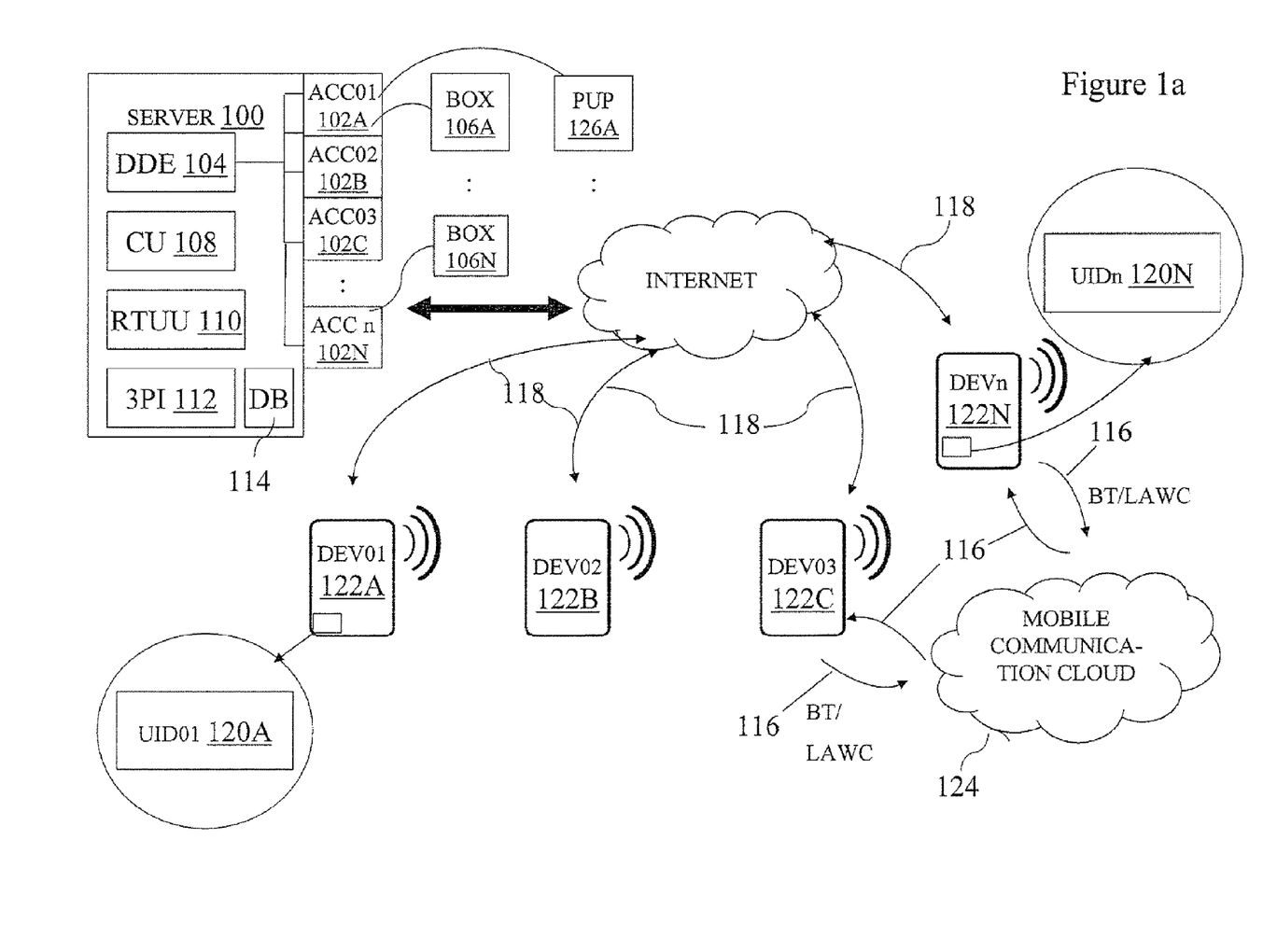
FIG. 1a is an illustration of various components of preferred embodiments of the invention.

Referring now to the drawings, FIG. 1a is a general overview of the various components and main features of the platform/system. The platform server 100 is the heart of the system. In some preferred embodiments, server 100 may be a cloud-based server. Users register user accounts ACC01-ACCn 102A-102N with server 100. Each user account is related to a user device DEV01-DEVn 122A-122N. In the exemplary depiction found in the Figure, ACC01 102A is related to DEV01 122A, ACC02 102B is related to DEV02 122B and so on. In some preferred embodiments, user devices 122 can be mobile telecommunications devices such as cellphones or smart phones, whereas in other embodiments, the user devices 122 may be static transceivers. The user devices are discussed in further detail elsewhere in this disclosure. Server 100 includes a number of modules or units, the first of which is the Data Distribution Engine (DDE) 104 which manages cross-account activities (data transactions between user accounts). Each user account 102 contains user information/data. One of the major optional features of the system is the Box 106A which includes specified user data, selected by the user. Each account includes one or more individual Boxes. Commenting Unit (CU) 108 facilitates the activities of the commenting feature described in detail elsewhere in this document. Real Time Updating Unit (RTUU) 110 controls and manages all the features that fall under the general category of Real Time Updating. 3$^{rd}$ Party Interfacing unit (3PI) 112 manages all 3$^{rd}$ party interfacing with the system.

User devices 122 employ both Local Area Wireless Communication 116 (LAWC) technology and Wide Area Wireless Communication 118 (WAWC) technology. Proximal communication is enabled by creating a Mobile Communication Cloud (MCC) 124, which is an ad-hoc wireless network, among proximal user devices 122 using LAWC technology 116. Remote communication with server 100 is achieved via the Internet using WAWC 118 technology. Each user account 102 is identified by a Unique Identification (UID) 120 which is stored on the related user device 122. Account data is stored in a database (DT) 114 on the server or related to the server (potentially the stored data can include links to the actual data or additional data). The computing platform of the current invention optionally includes a registration unit, optionally accessed via the platform website, for registering a user account on the server. There may also be a user device registration unit for registering the mobile device that is linked or related to the user account. User device 122 can update the linked/related user account 102 (e.g. in the figure DEV02 122B updates the information in ACC02 102B) and can be updated by the system with new information or data that appears in the user account. That is to say that the mobile phone (e.g. DEV02 122B) downloads the content of the user account (e.g. ACC02 102B) from the server. When new information is added to the account—it is downloaded to the phone. The opposite is also true: the user can update the server using the mobile device. The user account 102 can optionally be updated via the platform website, using a username and password. DDE 104 manages all data transactions between the user accounts 102 and returns the updated user account information to the related user device 122. Generally speaking, only the updated data is sent to the user device.

How is data exchanged? In general, a first user device receives the UID of a second user device via the MCC created between the user devices. For example, in FIG. 1, DEV03 122C has created a MCC 124 with DEVn 122N using LAWC 116 technology (e.g. BT); DEVn exposes the UIDn 120N of the ACCn which DEV03 captures via the MCC; DEV03 then uploads the captured UIDn to server 100 via the Internet using WAWC 118 technology, whereupon DDE 104 uses UIDn to identify ACCn and copy the data stored in the user account to ACC03, which is the user account related to the user device DEV03. This general example does not include the preferred security features discussed in further detail below.

For purposes of security and privacy, users may wish to secure detailed information and expose only the most basic information to casual passers-by. Therefore the system supports two types of profiles that can be seen by a proximal user: a Public Profile with minimal information and a Private Profile with more detailed information intended for trusted users. In order to view a private profile at least a basic level of security requirements my be met. In case of suspicious behaviour a further level of security is activated. In some instances, security settings may always be set to the higher level, due to increased sensitivity of the information which is being protected.

In some envisioned preferred embodiments, each account has a Public Profile (PUP) 126 and a Private Profile (PRP) 126'. The PUP 126 is available to any other registered users of the system. The PUP 126 may be empty, returning null-information on the user. The user may apply filters according to which the PUP 126 is exposed to other users (e.g. only an age range of X to Y, or only to students etc.). On the other hand, the PRP 126' is available only to users who have received permission from the profile owner. In order to receive the PUP a user device must create an MCC 124 with a second user device. This MCC is an Unsecure MCC (U-MCC) which is created using the autodetect mechanisms such as, but not limited to, Bluetooth™ Autodiscovery function or for example WIFI network discovery function. The autodetect scans the immediate vicinity and identifies other user devices, receiving the UID 120 of each device. This UID is an Unprotected UID (U-UID). The U-UID allows other user devices to access the user account PUP 126 only. If a user wishes to view the PRP 126' of another user the users must create a Secured MCC (S-MCC) 124', which, once established, allows a user to give a Protected UID (P-UID) 120' to a second user (see FIG. 1b). The P-UID 120' can then be used to access the first user's PRP 126'. An S-MCC 124' may be established by using one or more security measures such as those described below. In cases of suspicious behaviour a further level of security is activated before the user is granted a P-UID 120'. Users may indicate their willingness to create an S-MCC by selecting such an option presented via a Graphic User Interface on the mobile device. Potentially an S-MCC may be initiated by a first party and only agreed to by a second or other parties.

Generally, the data share and transactions (account inter-relations) take place within the sever and not between the user devices, although in some instances, data is exchanged between user devices (e.g. the Challenge Response Mechanism discussed below, whereby two user devices exchange information in order to create a secure connection). DDE 104 manages the data transactions between the user accounts, that is to say that the DDE effects data sharing and/or exchanges between user accounts in response to queries, searches, requests and other such instructions which are received from the mobile user devices related to the user accounts. Users communicate with the server and the server updates the other users. This guarantees high performance as contemporary smart phones and devices have a large and ever increasing Internet bandwidth.

Figure 2:
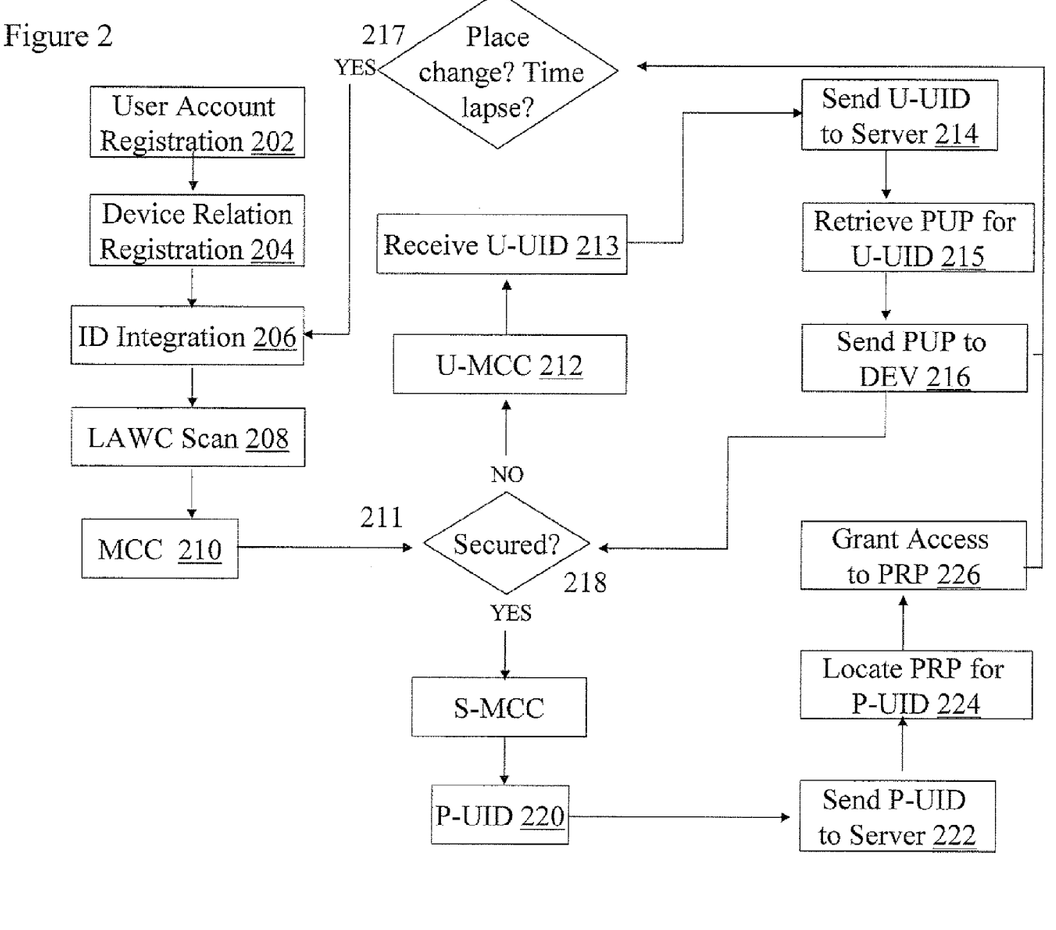
FIG. 2 is a flow chart of use of preferred embodiments of the invention.

FIG. 2 illustrates a flow chart detailing a preferred embodiment of the major functions of the DDE 104 of the current invention. Referring to both FIGS. 1 and 2, in step 202 a user registers an account on server 100. The server creates a unique account registered to the user (e.g. ACC01 102A). In step 204 the user registers or relates a user device (e.g. DEV01 122A) to the account. In some embodiments, the mobile user device 122 may be registered when the user account is registered. In other embodiments, the user device may be registered/related at the beginning of each session, optionally by inserting a username and password, or similar procedure. Optionally, a user can download a client application which interfaces with the server, onto the related mobile user device. The application handles connection, verification/authentication of the user device vis-à-vis the server. In an alternative embodiment, the user accesses the server via a cellular Internet portal, directly from the registered mobile device (username/password).

Once the user device is securely associated with the user account, the device receives or draws identifying information from the server. This is especially true with protected UIDs which are generated by the server and updated periodically. At this point the user can then supply the online account with information from the device (whether static or dynamically updated when the information is updated on the handheld device), or via a web portal such as a website. This information can be, for example, personal details, Facebook™, Twitter™, LinkedIn™, Paypal™ etc. accounts, a personal website address, The Box (described in detail elsewhere), some or all of the above. Although possible to update the user account from the user device, this is usually done in the case of small updates. Major updates are usually made via the secured website, using a username and password to access the account.

In step 206 the application puts the unique ID in the Friendly ID field of the Bluetooth accessory integrated in the mobile device. Alternative technologies already mentioned may be used to substitute Bluetooth technology, the unique id is placed in a field exposed by auto-discovery mechanisms or features parallel to the auto-discovery mechanism (e.g. WIFI network name and WIFI network discovery). The integrated UID is most preferably used by other devices during Auto-Discovery sessions. In case of S-MCC, the inserted UID is a P-UID which is periodically updated by server. The P-UID is only broadcast with permission. The permission may be given at the time the S-MCC is created or at the time the P-UID is to be broadcast.

In step 208, a registered user with a LAWC enabled device scans for compatible devices in the immediate vicinity (e.g. using the BlueTooth™ Auto Discovery mechanism, which does not require any handshaking. The auto discovery mechanism allows one Bluetooth transmitter to identify all surrounding smart phone Bluetooth transmitters unique MAC IDs and friendly IDs up to a range of 30 m within twelve seconds.). The auto discovery mechanism creates an MCC between the user devices (step 210).

In step 211 the decision is made whether the MCC is to be secured or remain unsecured. The Unsecured MCC (step 212) allows the free transmission of MAC and Friendly IDs within the cloud (step 213).

In step 214 a query, including the MAC ID and/or Friendly ID (i.e. the U-UID) of a discovered device, is sent to the server (generally using WAWC technology) requesting the PUP of the discovered LAWC enabled device. The DDE on the server searches for the registered account related to the unique ID discoved by the user device (step 215). If any account is found, the server sends the related PUP to the user (step 216). The user receives and can then view the PUP and decide whether to initiate contact, send an SMS, establish a Secured MCC or any other type of interaction. The PUP can be static or can be dynamically updated when the profile owner updates the online profile. When the user changes location or a predetermined period of time passes (step 217), the process begins again from step 206.

On the other hand, if the user decides to initiate an S-MCC with one or more user devices (step 218), then security protocols are enabled, resulting in the passing of a Protected UID (P-UID—step 220) to the user. Where there is cause for suspicion, such as two discovered devices having the same indentifier (a clear indication that one of the devices has been hacked) a further level of security is enabled to ensure that the P-UID is indeed protected. One such higher-level security measure is the Challenge Response protocol, which is detailed below. The P-UID is sent to the server in step 222 whereupon the DDE locates the registered account related to the P-UID (step 224) and grants access to the PRP (i.e. user account) in accordance with the validity of the related to the P-UID (step 226). Access to the PRP may be permanent, temporary or dependant on whether the devices are still in proximity of each other. Go to step 217. The process starts again at 206 as space change/time elapse occur and server renews P-UID and new P-UID is integrated into device.

The following example illustrates a optional use of the application described immediately hereforeto. Jonnie is drinking his beer in the local pub when a nice girl walks in. Jonnie activates his smart-device discovery mechanism and, using the current innovation, receives five Public Profiles. He identifies the profile of the girl in question from her picture in the PUP and checks her out. Jonnie accesses her Facebook™ account public page and finds out that her name is Helen and that they have a common friend. Jonnie then decides to approach the girl and invite her for a drink. At some point in the evening, Helen and Jonnie decide that they like each other and agree to establish an S-MCC between the two devices. The each grant access to their PRPs so that Jonnie is now able to access Helen's user account and exchange data between their respective user accounts and vice versa.

Figure 1B:
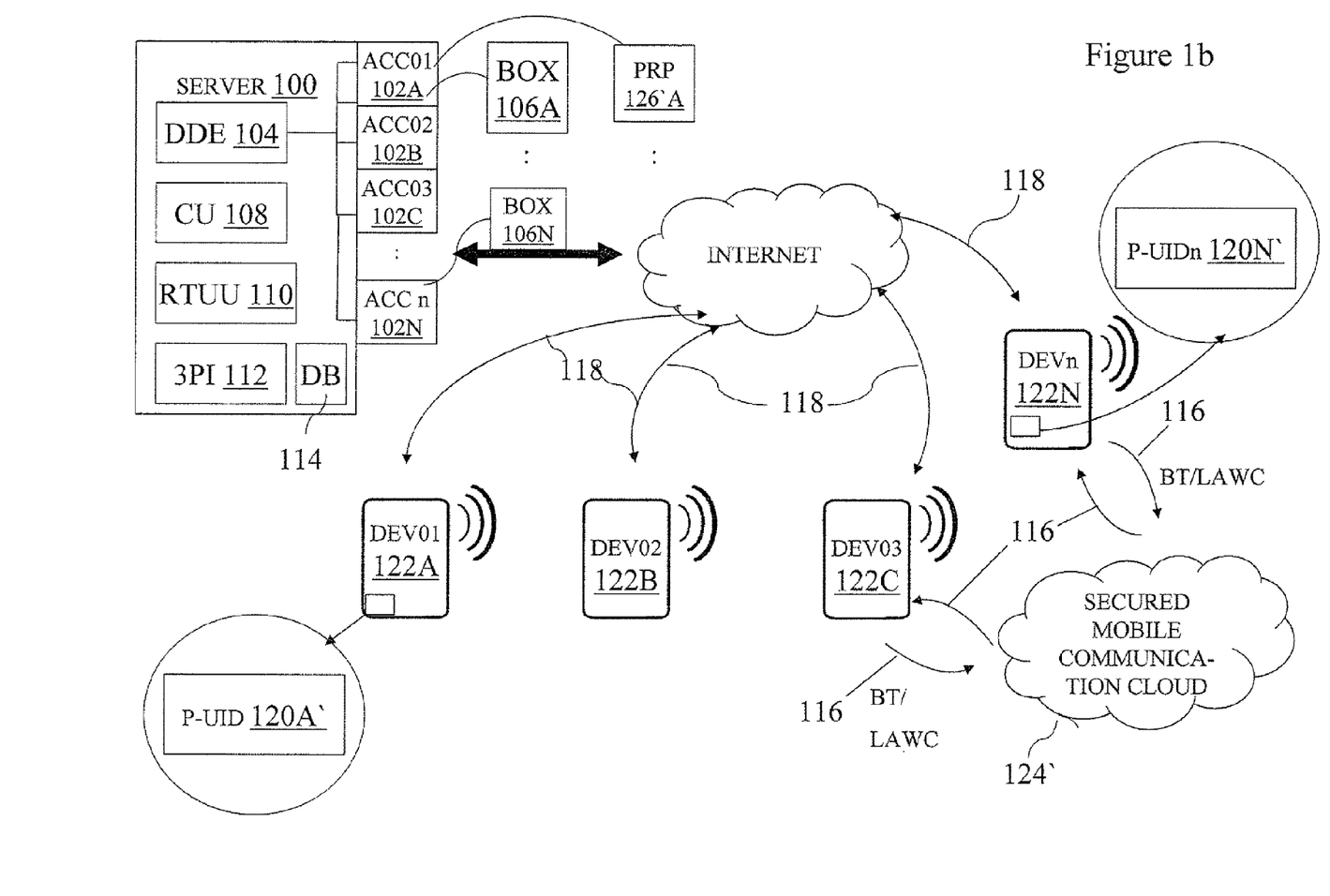
FIG. 1b is an illustration of various components of preferred embodiments of the invention with secure communication.

A day afterwards Helen is at the elevator on her way to work, a hacker wishes to gain access to Helen's company enters the elevator with her. Both Helen and the hacker are currently logged into the system in S-MCC mode and are active logged-on users for their own purposes. The company uses a smart door which detects the user identity related to the smart device (FIGS. 1*a*/1*b*) and decides whether or not to open. The hacker wishes to impersonate Helen so he programs his device to retransmit Helen's received P-UID.

In this scenario users are using both Bluetooth and NFC as LAWC so the P-UID is integrated into Bluetooth's Friendly ID field and into NFC custom programmable field—thus the hacker recieves Helen's P-UID in the Bluetooth autodiscovery process. Now both the hacker and Helen are transmitting the same P-UID. Helen approches the door and places her mobile next to the NFC reader. The door is configured to perform the challenge response security protocol at all times. As Helen logged in to the system using her user name and password her device and only her device has access to the private key of Helen's account in the server and is therefore able to pass the challenge and the door opens. The hacker, who has Helen's P-UID approches the door and also puts his device next to the NFC transmitter. The door identifies the P-UID and starts the challenge response sequence. The hacker, who does not have Helen's user name and password does not have access to the private key in the server and thus is not able to pass the challenge and fails to enter through the secure door.

Some optional additional features and capabilities of the system are enumerated below. As mentioned previously, the information (e.g. PUP/PRP), linked to a smart device by the server, can be updated dynamically and automatically thus, other smart devices which currently receive information or received information at an earlier time regarding that smart device will be updated automatically as well. One optional example is a 'Current Location' feature. This data field is dynamically and automatically updated according to the current whereabouts of the user based on Global Positioning Satellite (GPS) data. At each new location, recognized by cross-referencing with a Geographic Information System (GIS), the 'current location' field of the user is update automatically. Likewise, the PUP or PRP of the user, which has been downloaded by other registered users, is dynamically updated in real time. Illustratively, Mark is a registered user who has included a 'current location' field in his PUP. Henry, a co-worker of Mark, has recently downloaded Mark's PUP, when both were at work. Currently, Henry checks Mark's PUP on his mobile and sees that Mark's current location is the local hospital. Concerned, Henry calls Mark to check that he is alright.

A optional variation of the abovementioned embodiment is envisioned whereby Friendly IDs/MAC IDs received/exposed during the duration of a certain period of time (e.g. a day) have scheduled upload/download times (or other schedule trigger, e.g. predefined quantity of IDs received) at which point the mobile device updates the online server with the IDs and receives a list of information-per-ID which is available for download from the server. The user can then select which information to download and which to discard, this is refered as Disconnected Mode and is especially useful when only LAWC features are available but not WAWC for a period of time, when the user can only collect UIDs but can not receive the identities related to them. In disconnected mode the user can still use P-UID wherein receiving from the server a list of P-UID's and corssponsding public keys and private keys and time sets to when to replace them automatically A further optional feature is a Static/In-Place transceiver that can also be registered in the server and have information linked to it. Such transceivers can be used, for example, by stores/coffee shops to publish and receive data from users entering the store.

Figure 4:
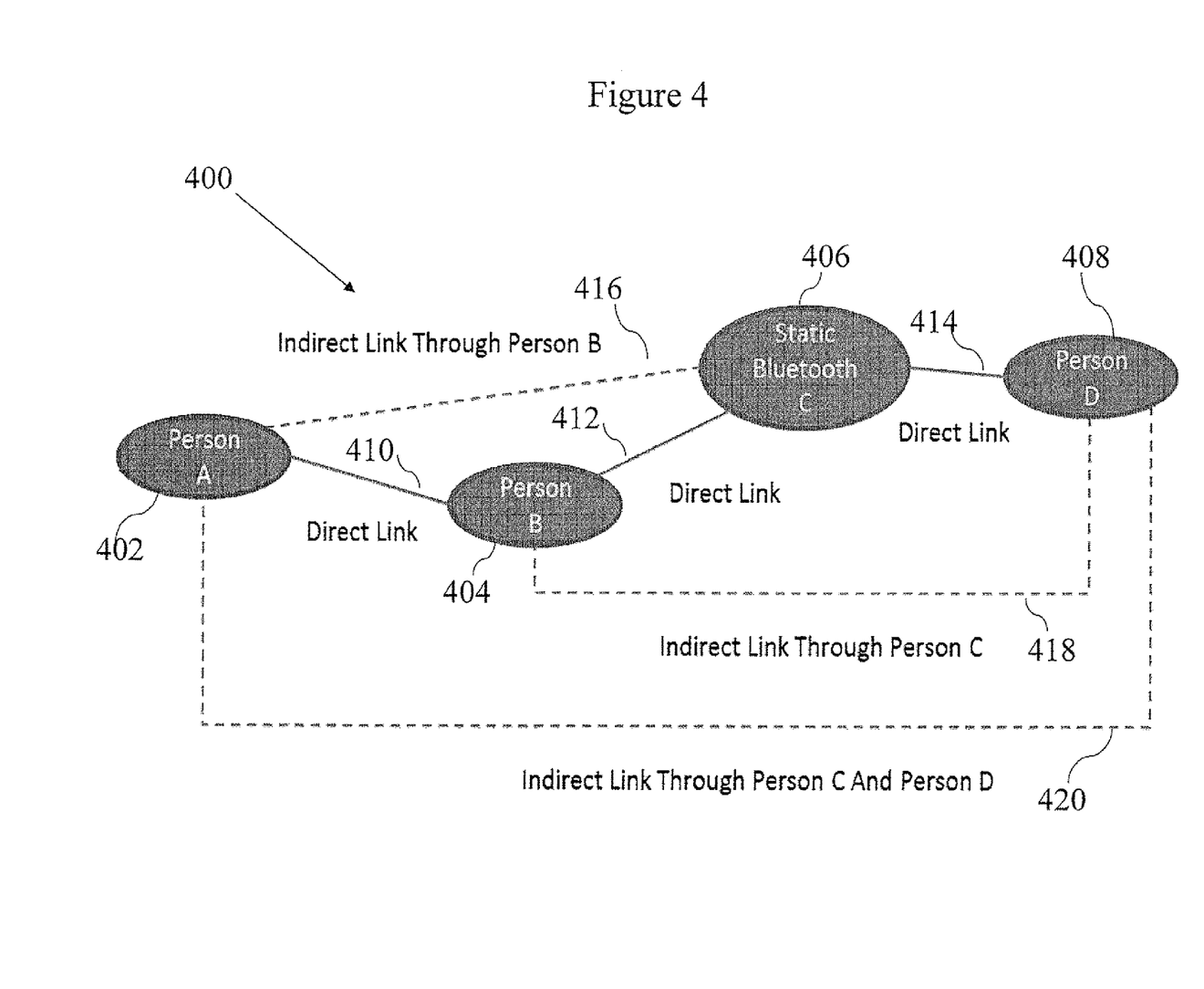
FIG. 4 is a diagram of a preferred embodiment of a relational graph of the present invention.

A further optional feature is Relational Network Analysis and Data Sharing. Each user is linked to/aware of other users in the immediate vicinity (or static transceivers) who, in return, are connected to further proximal users (some overlap exists, of course). A special Relational Network is formed between all connected users in a given area. FIG. 4 is an exemplary depiction of an embodiment of a Relational Network 400. Optionally, users can receive information exposed by other users who are only indirectly connected, i.e. via an intermediate user or users. For example, in FIG. 4, Person A 402 is directly connected 410 to Person B 404 who is directly connected 412 to static transceiver C 406. Person A has an indirect connection 416 to Static C 406. Static C is directly connected 414 to Person D 408, which affords Person B 404 an indirect connection 418 to Person D (through Static C) as well as indirectly connecting 420 Person A to Person D. The system supports relational network analysis/queries/filters for additional features obvious to those skilled in the art. As explained elsewhere herein, all or most of the data transactions take place on the server between user accounts, which are linked via the Relational Network.

The Relational Network also affords an additional feature called Reactive Discovery. With Reactive Discovery as soon as one user device discovers a second user device, no matter what type of devices each user has, the Relational Network registers/connects both devices and informs the discovered device, that it has been discovered by another device. This overcomes the problem which some types of devices have whereby they are able to discover other device but are not being able to be discovered themselves.

A further optional feature is a Time Delay link, whereby a first user linking to a second user (or Static transceiver), can connect to a third user even though the second user is no longer in proximity to the third user. The period of time during which users (e.g. the third user) are available for indirect connection can be predefined in the system.

A further optional feature is Data Sharing/Transfer between users and objects as well as between objects and other objects. Exemplarily, a user approaching a smart door will be recognized by the smart door which will then automatically open. A smart car (a car with an In Place transceiver) nearing a smart garage door is recognized by the garage door which then automatically opens.

Security Measures

A further optional feature is a Periodic ID Update where every set or predetermined time cycle the server changes the unique ID related to that user (without asking the user for permission), so that the unique ID the user now publishes becomes invalid over time, and the user then has to ask the server again for the updated unique ID otherwise the LAWC/Bluetooth component will publish an invalid unique ID. This security measure ensures that a hacker trying to impersonate a valid user by 'stealing' the valid user's unique id will not succeed. The stolen unique ID becomes invalid at the end of the time cycle and the hacker will not be able to impersonate the valid user for more than one time cycle. This security measure is usually used to secure a Protected UID. In other embodiments, the Periodic ID Update may additionally or alternatively be used in an S-MCC. In an alternative embodiment the server only updates the UID when the user requests a new ID, but if a set period of time passes and the user does not request a new UID, then the current UID will become invalid. In this embodiment, it is the user's responsibility to request a new UID every predetermined time interval.

Figure 5:
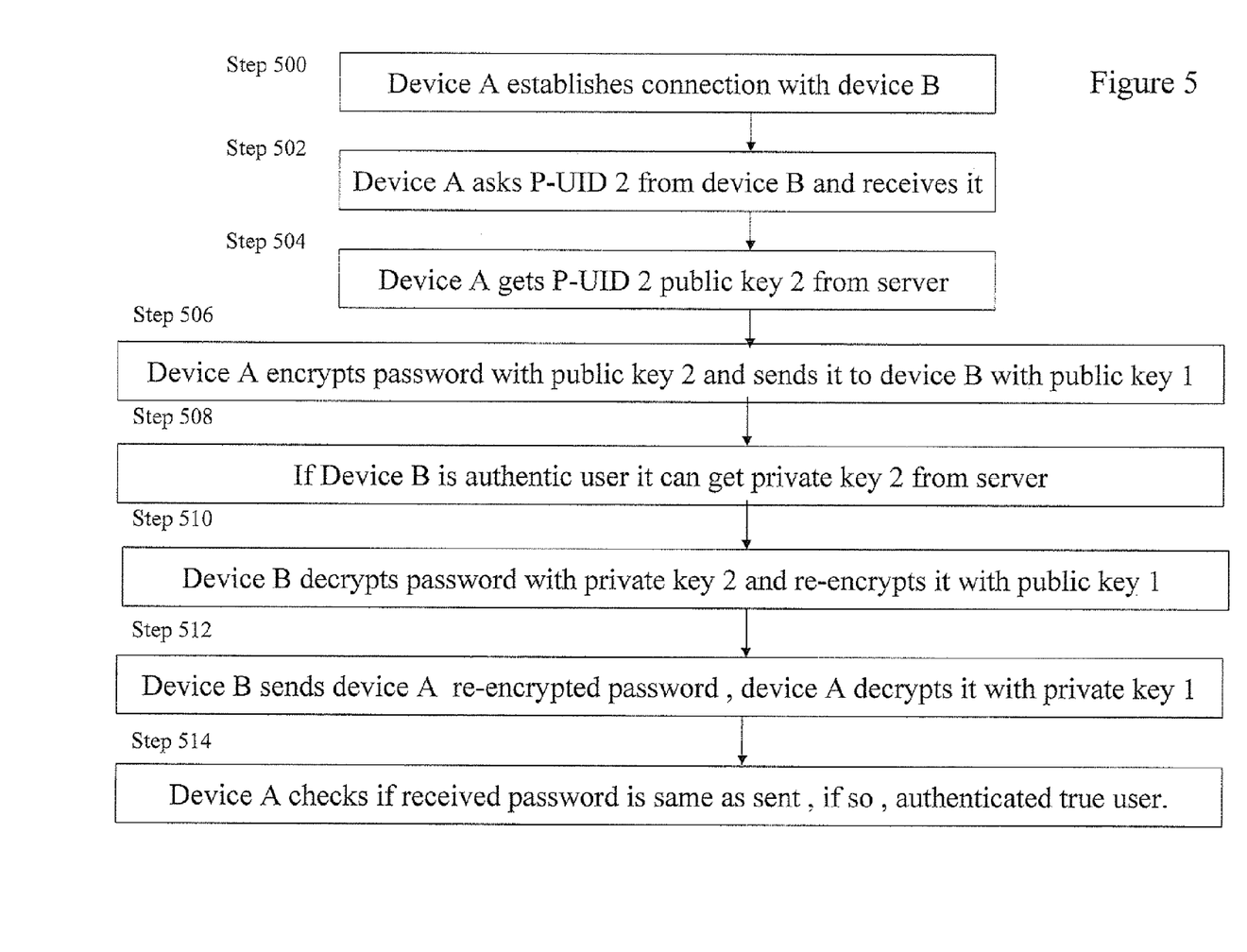
FIG. 5 is a flow diagram detailing the steps of a Challenge Response.

Challenge Response: In a case where there is more than one person that has the same unique ID (evidence of an imposter) or in an S-MCC which demands a higher level of security, the security mechanism that is employed is a Challenge Response Mechanism. FIG. 5 depicts a flow diagram of the Challenge Response process. A user can also define that the challenge response mechanism will always be used (security mode). The Challenge Response Mechanism works as follows: The server generates a constantly changing public key and private key for each user that is logged into the system.

In step 500, User A initiates a direct connection with User B, and in step 502 User A asks user B to send him his UID (usually a P-UID). In step 504, User A uses this UID (denoted "P-UID 2", in FIG. 5) to query the server in order to receive user B's public key (denoted "public key 2" in FIG. 5). In step 506, User A uses the public key of user B (who is in the vicinity) to encrypt a passcode (e.g. a random number or in some embodiments a password generated by the server) and send the encrypted number as well as a public key (which User A potentially downloaded from the server) back to User B. (Alternatively, User A may send his UID to User B, whereupon User B downloads the Public Key of User A.) In step 508, if User B is the authentic user (not an imposter) then connects to the server and retrieves the private key (denoted "private key 2"). User B is verified, by the server, as the authentic user by a username and password. In step 510, User B then decrypts the passcode with the downloaded private key and re-encrypts the passcode using the public key from User A (denoted "public key 1"). In step 512, the re-encrypted passcode is sent back to User A. User A decrypts the passcode and, in step 514, compares the passcode with the original passcode sent earlier. If the passcodes match then user B is authentic because only the authentic User B has the right private key to decrypt the passcode that was encrypted using User B public key. If the passcodes do not match then User B is an imposter who has stolen a third user's UID.

Most likely User B and User C have the same unique ID because User B stole the unique ID of User C (which is shared with other users in proximity range) and changed the friendly id of his/her own device to be the same as that of User C. Both User B and User C will have the same UID but only User C will have the corresponding private key as he has access to his user account in the server using a username/password.

Exemplary scenario: User B and User C are both standing in the elevator. User B performs Bluetooth auto discovery and automatically retrieves the Unique ID and MAC address of User C with an automatic hacking application that copies the fields in question from User C's device to User B's device. User B and User C leave the elevator and walk towards a secured door working on RFID (The RFID mechanism works just like the Bluetooth, with a Unique ID stored in one of the custom fields for system use, but with a very short range of several centimeters). The smart door is defined to work in secured mode. User C puts the cell phone in front of the RFID reader of the door, which automatically presents the challenge response test. Passing the test, the door admits user C. User B quickly puts his cell-phone in front of the RFID reader, but does not pass the challenge response test, and the door remains closed. Potentially, the door can immediately notify the application on device B (they are now in direct communication over a secure mobile BT cloud) that it has been hacked. Device B notifies the server that a user with the SIM card number and/or cell-phone serial key and/or phone number tried to hack the system. The system then locks the SIM number/cell-phone serial number/phone number from the system.

The Challenge Response may be used in addition to, or interchangeably with federated security—web/distributed authentication/brokered authentication mechanisms such as OpenID, OAuth, WSFederation. The above described Challenge Response mechanism is just one exemplary method of implementation of the Challenge Response.

Bluetooth Protection/Security/S-MCC: In order for the Bluetooth auto discovery mechanism to work the other Bluetooth component must be active. This is a serious security breach. In order to minimize Bluetooth active time, two mechanisms are envisioned:

Time interval mechanism/protocol: The clients receives a time directive (or a list of time directives) which includes an activation time (hh:mm:ss) when the Bluetooth device will be activated and the auto discovery initiated a deactivation time and an instruction set instructing the application to initiate the auto-discovery mechanism. Alternatively the server can fire an event that directs the Bluetooth to activate immediately. The installed application on the mobile device activates the Bluetooth and initiates the auto-discovery mechanism. All the client Bluetooth devices are therefore active, searching and exposing/publishing unique ID concurrently. Once the auto-discovery cycle is concluded or at the deactivation time, the application deactivates Bluetooth so that it is no longer discoverable and cannot be connected to until the application receives the next discovery time directive from the server.

Space change mechanism/protocol: Using cellular triangulation and/or GPS, the server determines that within a certain geo-spatial areas a significant change in user population has taken place (new users entered the space, old user moved out of the space) to warrant a Bluetooth activation and discovery cycle. The server fires an event notifying all devices (in the given geo-spatial area) to activate the Bluetooth and initiate auto-discovering. Once the auto-discovery cycle is concluded, the application deactivates Bluetooth so that it is no longer discoverable and cannot be connected to.

During the auto discovery cycle during which the Bluetooth is active, the application prevents any type of direct connection to the cell-phone except for the specific challenge response protocol. This prevents hacking attempts during auto discovery as well as spam and push messages.

The application does not prevent the user from activating the Bluetooth device manually while the application is open, (e.g. to connect to a head set or speaker). The application does not disconnect already connected devices during the auto-discovery cycle but does not allow new devices to be connected during auto-discovery (e.g. 12 seconds). During the auto-discovery cycle, the system does not allow defining of 'allowed' MAC IDs for connection, as a hacker is likely to try and impersonate a head set or speaker. Similarly, during the auto discovery cycle, no program is permitted to change the friendly/unique ID, programmable/customizable field or MAC ID (even if possible on OS).

Manual discovery—a user can define that the Bluetooth will never be auto activated, but activated for a single cycle only, in which case the Bluetooth is only activated during the next cycle, but not thereafter.

Information Container—'Box'

Figure 3:
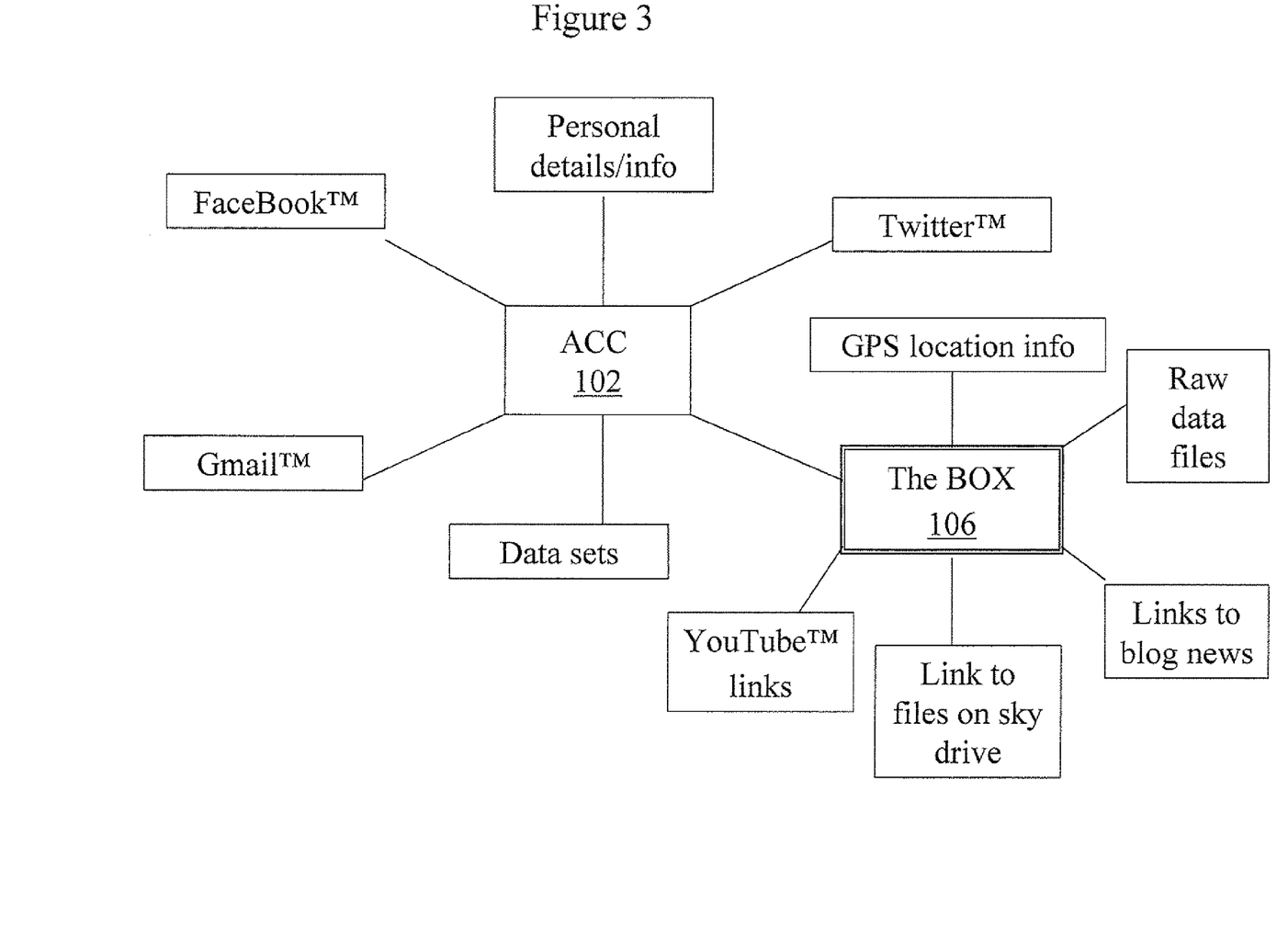
FIG. 3 is an illustration of various components of preferred embodiments of the server of the present invention.

FIG. 3 is an exemplary illustration of optional information and data sets that can be stored in a user account. Information stored in DB 114 and related to the user account 102 can optionally include data sets, such as but not limited to: news, events, social network account links, emails, feeds, knowledge data (e.g. Wikipedia pages), Hypertext links, blogs, media (e.g. YouTube), data regarding various locations, messages and any other transferable data.

Innovatively, several information items can be encapsulated/wrapped inside a virtual container such as a 'Box' 106 or a 'Capsule'/'Package' which relate to an information set (referred to hereafter as a Box or Boxes). The Boxes may be stored on the mobile device itself or on the server in the user account. Exemplarily (see FIG. 3) a Box contains a set of raw video files, images, documents, links to YouTube videos, GPS location information, links to files on the cloud (sky drive) and links to blog sites, news articles.

Predefined conditions and filters can be set to decide allowance/non-allowance of Boxes for distribution. Exemplarily, a social network 'direct friend' or 'indirectly related' individual is allowed. Exemplarily, if the 'profession' field in the personal information equals 'lawyer', then allow distribution.

The Box is tagged with the person/entity social network account/email/details of the individual who created the Box (information set) or originated that particular information transfer (i.e. did not create the Box but did pass forward to a third party). Information/Box received from one person can be passed to another person as is (automatic passing/forwarding can be predefined once again if certain conditions are met), and the recipient can see who originated this information pass. Each person who receives the box is added to its "passed through" list which can be viewed by each recipient. When a user receives a Box/information it is automatically related to his social network account. A detailed list of all the users who relayed the Box is available for viewing (by contact, by social network account).

Users can pass Boxes/information through social networks as well (Facebook, Twitter, etc.). When a user receives a Box in a social account, the Box automatically appears in the mobile smart device application of the user and can now be passed to other parties/entities the user comes into contact with.

Boxes can be tagged with several informative tags for easier filtering and identification. Boxes can be filtered, deleted, quarantined (spam, inappropriate content), queried, etc. A Box can have a specialized user interface (UI) representation including unique, user defined, skins (changeable decorative features for the UI).

Besides direct contact and social networks, Boxes can also be emailed. An auto relation unit/mechanism relates between a user email account and a social network account so that the social network account appears as the receiving entity for the Box and not the email account. On the other hand, in certain cases the email address itself will be added to the list of received users on the Box metadata.

It is understood that the Boxes are intended to be transferable with all applicable communication means for transferring data. The Box is intended to be updated/created once every given period of time (e.g. a week). The information contained in the Box may be partially shared, relating to the predefined filters and queries.

Example: An individual has a filter/query relating to lawyers. The mobile device comes into proximity with a second mobile device, registered in the system. The S-MCC registers the fact that $2^{nd}$ device is also lawyer related but finds no other filter/query in common. The information from the Box regarding "lawyers" can be shared (either mobile to mobile or via the online server where the information is passed from the account related to the first mobile user to the account related to the $2^{nd}$ mobile user).

Security Credential/Tokens

When registering through the system/platform website, an individual can link/relate/bind accounts on other social networks (or other websites which employ a user account setup) to the system. The system requests user security credentials (security token) from each of the relevant $3^{rd}$ part websites. Each social network then requests user approval as well as the user name and password for validation.

Using the security tokens from here on, the platform does not need to ask for permission when entering the $3^{rd}$ party sites on behalf of the user. This allows the system to access data that are not usually available when the user is signed out of the website or account. The security tokens are stored related to the user in the database. When the user activates the mobile application of the system and logs onto the server, the application retrieves all the security tokens from the server enabling the mobile application to operate on behalf of the user when querying data or displaying the specific websites and/or social networks.

If a security token becomes invalid (after a certain amount of time), the user is asked to renew the token by entering the password and/or user name. If the token is renewed through the system/platform website, then the token is simply updated in the DB. On the other hand, if the renewal is required during mobile application use, then the mobile application connects to the $3^{rd}$ party website for token renewal. After retrieving the token, the mobile application connects and updates the server with the new token.

Commenting Unit

A further innovative feature of the system is a Commenting Unit (CU) 108. It has become part of modern Western culture to share opinions and impressions with friends and acquaintances. Social media networks such as Twitter™ and Facebook™ allow people to share thought, ideas, impressions and audio/visual material. Blogs, forums and talkbacks allow people to do the same in more public areas of the Internet. The current innovative feature allows people to share opinions, impressions etc. of a particular location with others who are visiting or will visit the same location. A 'Placemark User' is a user that is logged in into the system (via either static Bluetooth/RFID/NFC transceiver or simply via a mobile device or laptop) that represents the place/establishment/location itself, e.g. a bar owner registers a user account (and device) for his bar, and when at work, logs in from his smart device under the bar username. For the sake of clarity, the term 'location', when used hereafter refers to the place, establishment or physical location according to the context in which the term is used.

The current feature allows a user to feed comments to server 100, where the comments relate to the Placemark User. The user in proximity to the static transceiver can 'post' a comment relating to the location and/or a picture or video clip of the location. The user can also receive relevant comments relating to the current location from the system server and/or $3^{rd}$ party servers. CU 108 and 3PI 112 manage the comments and interface with $3^{rd}$ party elements respectively. Real time updates are managed by RTUU 110.

The comments: The comments referred to herein relate to digital and or analog data that may be in the form of text, image, audio, video or the mixture of some or all the above and as well as other types of digital files. The comments may be, for example, an opinion of a service offered there (like a restaurant or spa) or particular opportunities currently available at the location. The comments may be, for example, images of the particular location or a video of an activity taking place there. These comments may be similar to a Twitter™ comment or a talkback comment commonly found, among other places, on social media networks and news websites.

Uploading: The user uploads the comments/images from a registered mobile device, where the comment is associated with the current location as authenticated by the proximal Placemark User device. The comment may be sent in the form of an SMS or MMS to the server. Alternatively the user may update their PUP with the comments, and/or update the PUP of the account related to the Placemark User. The information is processed by CU 108 and saved in database 114.

Downloading: Receiving the information based on location. The user can receive location-based information as verified by proximity to a Placemark User device. The radius of relevance for the information may depend on the LAWC technology in use by the proximal devices. There may be a maximum radius. The dating of the information may also be configured (e.g. comments from the last month about this location). In addition, the language of the comments to be received can be configured by filters (e.g. comments to be/not to be downloaded e.g. Spanish no, English yes).

Server: Processing the Information:

Data compression: The system supports methodology for reducing the size/volume of received data. In order to cope with the large amount of information, the processed data is automatically compressed when the clip or picture is uploaded to the server while taking into account the optimal quality vis-à-vis the size of the data. Other users will receive the compressed data.

Control and Filtering of the data: The content is scanned for viruses and malicious code, checked if it is spam or an inappropriate comment. The scans will be both manual and automatic.

Data Categorization: The data is categorized as positive, negative, humor, romantic, informative, advertisement. A comment may be defined as a "Sticky" meaning that it will have a permanent placement attached to that location, others may be defined as having an expiry date (1-2 days, a week, a month etc). Some comments will pop up first etc.

Additional features include: Sale of advertisements by location with a pricing scale depending on popularity of the location. For example Time Square in New York City being a popular location will offer expensive advertisement opportunities as opposed to the wheat fields of North Dakota which will offer minimal advertising opportunities. The user may configure the service to receive or reject location dependant advertisements.

The system may provide a service for cross-checking the location of a registered mobile device with a registered credit card transaction. If the credit card transaction takes place in a location different to that of the mobile device a message or call can be place to the mobile device to alert the user that the credit card may have been stolen.

Real Time Uploading Unit

RTUU 110 enables businesses (incl. clubs, bars, restaurants and the like) to stream and publicize real-time feeds regarding users and users' graph information and statistics that relate to the current location based on the methodology the system uses to recognize proximal users and create secured links/connections between them. The live feeds are available both through the Internet and cellular devices. The Internet server system categorizes establishments placing similar establishments under relevant headings or subheading.

Users who access the live feeds can receive a large amount of information regarding what is currently occurring or previously occurred at the location, e.g. a user looking for an establishment to frequent, for example a nightclub, may judge the 'vibe' in a number of nightclubs by the number of people present, the number of girls, and friends that are part of the Relational Network, to assist in deciding which nightclub to frequent. Similarly a restaurant can be viewed in order to ascertain how full a particular restaurant is.

A user can rate a personal experience using the Commenting Unit function. These comments will remain related to the Placemark User as explained above. This will also give a more accurate description of the experience as opposed to what the establishment itself is publicizing. Users may register to receive automated alerts regarding, for example, well-attended parties in the area (with rating). Location based publicity can alert a user to attractive activities in the immediate area, based on GPS location cross-referenced with a GIS database. Automatic links to maps and GIS content may provide a user with relevant information such as parking options or directions.

The system supports uploading virtual objects that can be viewed and/or manipulated with a smart phone. For example, a game company can distribute 'gold coins' (which have a certain value in a particular game) in the real world. When the user collects such coins in the real world, the character in the game is proportionately influenced.

In a further non-limiting feature, a user can define an additional virtual character that is related to a virtual character from an online video game the user is participating in (e.g. World of Warcraft™, Ever Quest™). Activities and assignments enacted by the user in the real world can be synchronized with the character in the game. All interfacing between the server and $3^{rd}$ party sources is handled by the 3PI unit 112.

Example: Joshua uploads the character of the knight from the game Ever Quest™, in which he is participating, to his iPhone. He then collects 'golden coins' distributed by Blizzard™, the gaming company. The next time Joshua accesses the knight character on the game company servers, the 'golden coins' will have been added to the list of objects carried by the virtual character.

One of the challenges facing online gaming is the inflexibility of the game from the point of view of mobility. The game is played at a console for a period of time. The system offers the ability complete assignments on a smart device such as an iPhone or to delay such activity until a more convenient opportunity arises.

Users who are participating in the same online game can trade objects in the real-world using a smart device. User-garners can compete with each other on smart phones (e.g. the respective virtual characters fight in the online game) when in geo-proximity or can collaborate on an assignment within the game in the same manner.

Furthermore, an automated alert can activate when a LAWC proximity scan detects a system user in proximity with a other users (one or more) having a second mobile device that includes a common application (e.g. a collaborative game, financial tool, etc.), and a manual, automated or semi-automated collaboration request can be sent from one user device to the other users or from the system to all. Further optionally, a $3^{rd}$ party entity such as the entity managing the application installed on the mobile device, can detect or be informed by the innovative system (e.g. via the 3PI module) that two users that have installed their application are in proximity, whereupon the $3^{rd}$ party sends an invitation to the users inviting them to collaborate using the application.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A computing platform comprising:
   (a) a server including:
      (i) a plurality of user accounts, wherein each of said user accounts is related to a respective user device and wherein each of said user accounts is accessible with a respective Unique Identifier (UID), said respective UID being stored on said respective related user device; and
      (ii) a Data Distribution Engine (DDE) adapted to effect data transfers at least from a first user account (UA1) to a second user account (UA2) of said plurality of user accounts;
   wherein a first UID of said UA1 is adapted to be discovered from a first user device (UD1) related to said UA1 by a second user device (UD2), at such a time that UD1 and said UD2 are proximally located, and
   wherein uploading of said first UID to said server, by said UD2, allows said DDE to transfer data from said UA2, related to said UD2 to said UA1, and to extract data from said UA1 to said UA2 even when said user devices are no longer proximally located.

2. The computing platform of claim 1, wherein said user devices are adapted to establish a Mobile Communication Cloud (MCC) therebetween when said user devices are proximally located, and wherein each said user device includes a Local Area Wireless Communication (LAWC) component capable of establishing said MCC and wherein said server communicates with each said respective related user device via Wide Area Wireless Communication (WAWC) technology.

3. The computing platform of claim 2, wherein said MCC is an Unsecure MCC (U-MCC).

4. The computing platform of claim 2, wherein said MCC is a Secure MCC (S-MCC).

5. The computing platform of claim 3, wherein said UID is an Unprotected UID (U-UID).

6. The computing platform of claim 4, wherein said UID is a Protected UID (P-UID).

7. The computing platform of claim 5, wherein each said user device is operable to receive a said U-UID from at least one proximal said LAWC enabled device via said U-MCC and communicate said received U-UID to said server; and wherein said U-UID grants access to a predefined data set related to a user account identified by said U-UID.

8. The computing platform of claim 6, wherein said user device is operable to receive a said P-UID from said at least one proximal LAWC enabled device via said S-MCC and communicate said received P-UID to said server; and wherein said P-UID grants access to data related to a user account identified by said P-UID.

9. The computing platform of claim 4, wherein said S-MCC includes at least one security protocol selected from the group consisting:
   (i) a time interval protocol, wherein said server transmits a time directive via said WAWC component to a said user device, said time directive including: an activation time, a de-activation time and an instruction set, wherein said instruction set includes instructions for said user device to initiate an activation cycle by steps including: activating said LAWC component at said activation time, performing a LAWC proximity scan to detect proximal LAWC enabled devices and deactivating said LAWC component at said deactivation time;
   (ii) a space change protocol, whereby upon determination, by said server, that a user population detected within a predetermined spatial area has altered in size by a predetermined value, said server initiates a said activation cycle; and
   (iii) a managed auto-detect protocol, whereby said LAWC component is instructed to perform a single said activation cycle in accordance with a single said time directive.

10. The computing platform of claim 6, wherein said P-UID includes at least one protection mechanism including a Period Identification Update mechanism, whereby said P-UID is changed each predetermined time cycle by said server.

11. The computing platform of claim 10, wherein said P-UID further includes a Challenge Response Mechanism, wherein said Challenge Response Mechanism includes the steps of:
   (i) providing each said P-UID with a Public Key and a related Private key which are stored on said server, wherein said related Private key is operable to decrypt data encrypted by said Public key and wherein said Public key and said Private key are periodically updated by said server, and wherein said Private Key can only be downloaded from said server by a said related user device identified by a username and a password;
   (ii) a first user device creating a direct connection with a second user device, said first user device requesting a P-UID from said second user device;
   (iii) said second user device sending a second P-UID, via said LAWC component, to said first user device;
   (iv) said first user device receiving said second P-UID and downloading a Public key provided for said second P-UID, encrypting a passcode with said second P-UID public key and sending said encrypted passcode and a first P-UID Public key to said second user device;
   (v) said second user device receiving said encrypted passcode, decrypting said passcode using a second P-UID Private key downloaded from said server and related to said second P-UID Public Key, re-encrypting said passcode with said first P-UID Public key downloaded from said server and sending said re-encrypted passcode to said first user device; and (vi) said first user device receiving said re-encrypted passcode, re-decrypting said re-encrypted passcode with a first P-UID Private key, related to said first P-UID Public key and comparing said re-decrypted passcode with said passcode encrypted with said second P-UID Public key; wherein if said re-decrypted passcode matches said passcode encrypted with said second P-UID Public key then said second P-UID is secure.

12. The computing platform of claim 2, further including a Relational Network feature, wherein if a first said user device is in proximity to a second said user device and said second user device is in proximity to a third said user device then said DDE is operable to effect data exchanges between a first said user account related to said first user device and a third user account related to said third user device.

13. The computing platform of claim 1, wherein each said registered user account further includes a Data Box, said Data Box operable to contain user specified data sets, and wherein said DDE is operable to transfer at least part of said specified data sets to additional said registered user accounts.

14. The computing platform of claim 13, wherein said at least part of said specified data sets is operable to be elected in accordance with at least one predefined filter.

15. The computing platform of claim 1, wherein said related user device is a mobile communication device.

16. The computing platform of claim 15, wherein said related user device is a static transceiver device.

17. The computing platform of claim 16, wherein said server further includes:
(iii) a Commenting Unit (CU), said CU operable to:
(A) receive a comment data set from a said mobile communication device, said comment data set relevant to a said static transceiver device, wherein said static transceiver device is proximal to said mobile communication device; and
(B) publish said comment data set to additional said mobile communication devices when said additional mobile communication devices are proximal to said static transceiver device.

18. The platform of claim 17, wherein said comment data set includes one or more elements selected from the group including: audio data, visual data, and text data.

19. The computing platform of claim 18, wherein said server further includes:
(iv) a Real Time Uploading Unit (RTUU), for receiving a least one said commenting data set from a said mobile telecommunication device; and publishing said at least one commenting data set to additional said user accounts.

20. The computing platform of claim 19, wherein said at least one commenting data set further includes one or more elements selected from the group including: audio stream, video stream.

21. The computing platform of claim 1, wherein said server further includes:
(iii) a third Party Interface (3PI) unit, whereby said 3PI unit facilitates interaction between at least one said user device, at least one said user account related to said at least one user device and a third party entity.

22. The computing platform of claim 21, wherein said 3PI unit facilitates interaction between at least two said user devices, related to said at least two user accounts, that have established a said MCC therebetween and a third party entity.

23. The computing platform of claim 22, wherein said third party entity is an entity selected from the group including: a website, a web service, an application, a social network, and an inter-network based system.

24. The computing platform of claim 11, wherein said second Public Key is downloaded from said server.

25. The computing platform of claim 11, wherein said passcode is downloaded from said server.

26. The computing platform of claim 1, wherein said UD2 is adapted to upload said first UID to said even when said user devices are no longer proximally located.

\* \* \* \* \*